United States Patent [19]

Bedford et al.

[11] Patent Number: 5,050,940

[45] Date of Patent: Sep. 24, 1991

[54] BRAKE CONTROL AND ANTI-SKID SYSTEM

[75] Inventors: Alan Bedford, South Bend; Curtis L. Carson; David A. Kolberg, both of Granger; David E. Scott, South Bend; Carol L. Stefano, Granger, all of Ind.

[73] Assignee: Allied-Signal Inc., Morristown, N.J.
[21] Appl. No.: 475,064
[22] Filed: Feb. 5, 1990
[51] Int. Cl.⁵ .................................................. B60T 8/32
[52] U.S. Cl. ..................... 303/100; 188/181 R; 188/181 C; 303/96; 303/103; 303/109; 303/68; 303/DIG. 4; 303/93; 244/111; 364/426.02
[58] Field of Search .................... 303/93-98, 303/113, 116, 117, 68, 119, 100, 92, 102, 103-111, DIG. 3, DIG. 4; 188/181 A, 181 C, 181 R; 364/426.01, 426.02, 426.03; 324/174, 173; 244/111; 310/155, 156; 250/227.11, 551, 231.13

[56] References Cited

U.S. PATENT DOCUMENTS

| | | | |
|---|---|---|---|
| 2,957,659 | 10/1960 | Yarber | 244/111 |
| 3,293,636 | 2/1966 | Dunne | 340/347 |
| 3,702,714 | 11/1972 | Branson | 303/21 P |
| 3,710,246 | 1/1973 | Herring | 324/162 |
| 3,716,787 | 2/1973 | Hammond | 324/173 |
| 3,756,664 | 9/1973 | Schlitz et al. | 303/21 F |
| 3,768,873 | 10/1973 | Hirzel | 303/21 |
| 3,836,208 | 9/1974 | Wienecke | 303/21 F |
| 3,856,365 | 12/1974 | Steigerwald et al. | 303/21 |
| 3,937,526 | 2/1976 | Ruof | 303/21 |
| 4,012,081 | 3/1977 | Doversberger | 303/115 |
| 4,131,325 | 12/1978 | Bayliss | 303/93 |
| 4,135,169 | 1/1979 | Williams et al. | 303/106 |
| 4,140,352 | 2/1979 | Delpech et al. | 303/93 |
| 4,150,314 | 4/1979 | Zabler et al. | 310/155 |
| 4,152,030 | 5/1979 | Blomberg et al. | 303/115 |
| 4,269,455 | 5/1981 | Beck et al. | 303/106 |
| 4,293,165 | 10/1981 | Hirzel | 303/93 |
| 4,318,018 | 3/1982 | Kennedy | 310/156 |
| 4,323,969 | 4/1982 | Skarvada | 364/426 |
| 4,336,592 | 6/1982 | Beck | 364/426 |
| 4,367,529 | 1/1983 | Masclet et al. | 364/426 |
| 4,374,421 | 2/1983 | Leiber | 364/426 |
| 4,392,202 | 7/1983 | Matsuda | 364/426 |
| 4,404,633 | 9/1983 | Goicoechea | 364/426 |
| 4,412,291 | 10/1983 | Amberg et al. | 364/426 |
| 4,414,630 | 11/1983 | Harris et al. | 364/426 |
| 4,493,509 | 1/1985 | Kilner et al. | 303/13 |
| 4,523,282 | 6/1985 | Beck | 364/426 |
| 4,536,708 | 8/1985 | Schneider | 324/174 |
| 4,543,633 | 9/1985 | Cook | 364/426 |
| 4,546,437 | 10/1985 | Bleckmann et al. | 364/426 |
| 4,550,372 | 10/1985 | Kahrs | 364/426 |
| 4,552,414 | 11/1985 | Fujii et al. | 303/115 |
| 4,562,542 | 12/1985 | Skarvada | 364/426 |
| 4,610,484 | 9/1986 | Amberg et al. | 303/100 |
| 4,622,516 | 11/1986 | Hearn et al. | 324/163 |
| 4,626,781 | 12/1986 | Forkel | 324/172 |
| 4,640,475 | 2/1987 | Zoerb | 244/111 |
| 4,646,242 | 2/1987 | Valaas | 364/426 |
| 4,656,588 | 4/1987 | Kubo | 364/426 |
| 4,660,146 | 4/1987 | Kubo | 364/426 |
| 4,665,490 | 5/1987 | Masaki et al. | 364/426 |
| 4,674,049 | 6/1987 | Kubo | 364/426 |
| 4,683,538 | 7/1987 | Guichard | 364/426 |
| 4,704,684 | 11/1987 | Kubo | 364/426 |
| 4,746,791 | 5/1988 | Forkel | 250/231 |
| 4,750,124 | 6/1988 | Lin et al. | 364/426 |
| 4,773,013 | 9/1988 | Crapanzano et al. | 364/426 |
| 4,794,267 | 12/1988 | Stevens | 303/115 |
| 4,805,105 | 1/1989 | Weiss et al. | 364/424 |
| 4,822,113 | 4/1989 | Amberg et al. | 303/100 |

FOREIGN PATENT DOCUMENTS 0037323  7/1981  European Pat. Off. .

*Primary Examiner*—Douglas C. Butler
*Attorney, Agent, or Firm*—Larry J. Palguta; Ken C. Decker

[57] ABSTRACT

A brake and anti-skid control utilizing optical input sensors for determining wheel speed or position and suitable for aircraft use is disclosed. A valve control has a continuous source of pressurized hydraulic fluid, a hydraulically actuated wheel rotation brake device which responds to applied hydraulic pressure to apply a braking force to the wheel to arrest wheel rotation, a low pressure hydraulic fluid return, and a flow control servo valve interconnecting the source, the return, and the braking device for directing fluid from the source to the braking device when in a first state and for directing fluid from the braking device to the return when in a second state. Applied hydraulic pressure is monitored and if that monitored pressure exceeds a command pressure, further fluid from the braking device is diverted to the return.

20 Claims, 9 Drawing Sheets

BRAKE CONTROL AND ANTI-SKID SYSTEM

The present invention relates generally to vehicular braking systems and more particularly to aircraft braking systems having anti-skid features.

Automobile drivers accustomed to driving under snowy or icy conditions are familiar with the technique of pumping the brake pedal so as to cyclically increase and decrease the braking force exerted on the wheels so that a slippery wheel having a tendency to lock is permitted to re-accelerate back to a speed corresponding to the speed of the vehicle. Such a driver induced antiskid technique is simulated by many known anti-skid devices. For example, U.S. Pat. No. 2,957,659 adapts known skid-preventing techniques where a skid preventing apparatus controls a solenoid anti-skid valve by detecting the initiation of wheel skidding due to the application of excessive brake pedal pressure, automatically enables the solenoid and releases the brakes allowing recovery of wheel speed, and then detects the ensuing acceleration of the wheel to de-energize the solenoid and reapply the brakes to aircraft braking systems. The particular adaptation in this patent arrangement is by adding a flow restricting device in an attempt to smooth out the pulsations and maintain braking at near maximum without skidding. U.S. Pat. No. 3,776,605 illustrates an attempt to provide an electro-hydraulic braking system having anti-skid capabilities which has the "feel" of a conventional purely hydraulic system. In this patented arrangement, the brake pedal is manually controlled against a spring force to develop an electrical signal which is directly proportional to the degree of pedal depression. A signal inversely proportional to the degree of wheel skid is generated and compared to the electrical signal and the lower of the two is selected to drive an electro-hydraulic valve which controls hydraulic pressure to the brakes.

U.S. Pat. No. 4,078,845 includes a theoretical discussion of the relationship between the slip of an aircraft wheel and friction under a variety of environmental conditions and provides a pilot's deceleration rate selection switch allowing the pilot to specify icy, wet or dry runway conditions. This selection switch allows for braking operation within one of three ranges, all on the "front side" of the Mu/slip curve. A Mu/slip curve is a graphical representation of the coefficient of friction as ordinate and percent slip (the difference between the indicated and theoretical wheel speed divided by the theoretical value and multiplied by 100) as abscissa. After initial tire deformation, the coefficient of friction reaches a maximum and thereafter falls off (the back side of the curve) as actual tire slippage occurs with attendant increased tire wear, reduced side forces (cornering) and, of course, reduced friction. This patented arrangement operates entirely on the front side of the curve while the earlier discussed devices generally operate first on one side of the curve and then on the other as actual tire slippage appears and then disappears.

U.S. Pat. No. 4,546,437 addresses the question of the reliability of a brake slip control apparatus by providing redundant microprocessors operating under the same software. When inconsistent results are recognized, the brake slip control circuit is disabled and an error signal occurs.

U.S. Pat. No. 4,131,325 discloses an electronically controlled brake system including anti-skid protection circuitry with a pair of pulse width modulation circuits driving the valve which admits high pressure hydraulic fluid to actuate the brake and the valve which releases that fluid from the brake allowing it to return to a low pressure reservoir. This device is a pressure as opposed to a flow control type device.

Many different types of wheel speed (or position) sensing transducers are known not only for conventional odometer and speedometer indication applications, but also for use in controlling the operation of vehicle anti-skid systems. For example, U.S. Pat. No. 3,949,252 discloses wheel hubcap mounted permanent magnets and a sensing coil fixed to the axle adjacent the hubcap in which a series of pulses are induced as the wheel rotates. Such an arrangement is essentially an alternating current generator having an output frequency proportional to the angular velocity of the wheel, and since the effective wheel diameter is known, also proportional to vehicle speed.

U.S. Pat. No. 4,767,164 discloses an optical wheel speed sensor for use in an anti-skid system utilizing a rotating disk having alternate reflective and transmissive segments along with a single optical fiber which both conducts light to the wheel and provides a return path for a modulated light wave having a component the frequency of which is proportional to wheel speed. It will be understood that the sensor is frequently called a speed sensor in these patents and in the sequel, however, it normally senses the position of the wheel with successive derivatives providing the wheel speed (angular velocity) and acceleration.

Among the several objects of the present invention may be noted the provision of a thoroughly redundant brake control system; the provision of speed and position sensors which are optical or opto-magnetic in operation; the provision of speed and position sensors with built in redundancy of operation; the provision of a brake and anti-skid control which has a radically different method of searching for optimum braking characteristic as compared to current systems; the utilization of a flow control servo-valve with pressure feedback to simulate a pressure control servo-valve; the reduction of the likelihood that electromagnetic interference will cause a false indication or a false response in an aircraft braking system by utilizing optical speed and position sensors; and the provision of an improved brake and antiskid control system which utilizes largely proven components These as well as other objects and advantageous features of the present invention will be in part apparent and in part pointed out hereinafter.

In general, a combined brake and anti-skid controller for a wheeled vehicle has a continuous source of pressurized hydraulic fluid for selectively energizing a hydraulically actuated wheel rotation braking device which device responds to applied hydraulic pressure to apply a braking force to the wheel to arrest wheel motion. There is a low pressure hydraulic fluid return and a flow control valve is connected in circuit between the source, the return, and the braking device for directing fluid from the source to the braking device when the valve is in a first state and for directing fluid from the braking device to the return when it is in a second state. A pressure sensing transducer provides feedback information for controlling the flow control valve.

Also in general and in one form of the invention, optical position and optical speed sensors incorporate redundant aspects and are suitable for use in aircraft brake control systems. Sensors develop pulse trains, the repetition rates of which are representative of the instantaneous angular velocity of a wheel. There are first and second fiber optic light paths from a pair of independent light sources to a location close to the wheel along with third and fourth fiber optic light paths from said location to a further location remote from wheel. Two pulse trains are developed by a common rotating disk or drum at the location close to the wheel. The rotating drum or disk may, for example, include alternating opaque and transparent segments so as to be responsive to wheel rotation for alternately interrupting and completing a first light-passing circuit between the first and third light paths, and a second light-passing circuit between the second and fourth light paths.

Still further in general and in one form of the invention, a process and apparatus utilize modified Kalman filter techniques for estimating a time dependent variable such as a braked wheel position and the first and second derivatives thereof, and includes sensing the motion of the braked wheel, combining the sensed motion with a computed estimate representing the sensed motion to form the difference between the sensed motion and the computed estimate thereof, integrating the difference between the sensed motion and the computed estimate thereof to provide a representation of the second derivative of the time dependent variable, performing a further integration of the second derivative of the dependent variable to provide representation of the first derivative of the time dependent variable, performing a still further integration to provide a representation of the time dependent variable, and using the result of the still further integration as the computed estimate representing the sensed motion. The computed first and second derivatives provide estimates of the wheel velocity and acceleration, respectively.

Again, in general, the process of monitoring the motion of a braked vehicle wheel and controlling the application of a hydraulically applied braking force to the wheel including the introduction of a controlled slip between the wheel and a surface on which the wheel rolls and the derivation of signals indicative of the slip and of the braking force. The slip indicative signal is periodically incremented and the resulting change in braking force indicative signal is sensed. The hydraulically applied braking force is reduced in the event the increment and resulting change differ in sign indicating operation on the back side of the Mu/slip curve.

The present invention comprises a combined brake and anti-skid controller for a wheeled vehicle comprising means for sensing the motion of a vehicle wheel; means for comparing the sensed motion of the vehicle wheel to the theoretical motion the wheel should be experiencing in a free wheeling condition; a flow control valve in a circuit between a source of pressurized hydraulic fluid, a low pressure hydraulic fluid return, and a hydraulically actuated braking device, the flow control valve directing selectively fluid from the source to the braking device and from the braking device to the return; and means including the flow control valve for diverting additional fluid to the return when the comparison indicates actual wheel motion is a predetermined threshold difference below the theoretical wheel motion.

BRIEF DESCRIPTION OF THE DRAWING

Corresponding reference characters indicate corresponding parts throughout the several views of the drawing.

The exemplifications set out herein illustrate a preferred embodiment of the invention in one form thereof and such exemplifications are not to be construed as limiting the scope of the disclosure or the scope of the invention in any manner.

DESCRIPTION OF THE PREFERRED EMBODIMENT

Figure 1:
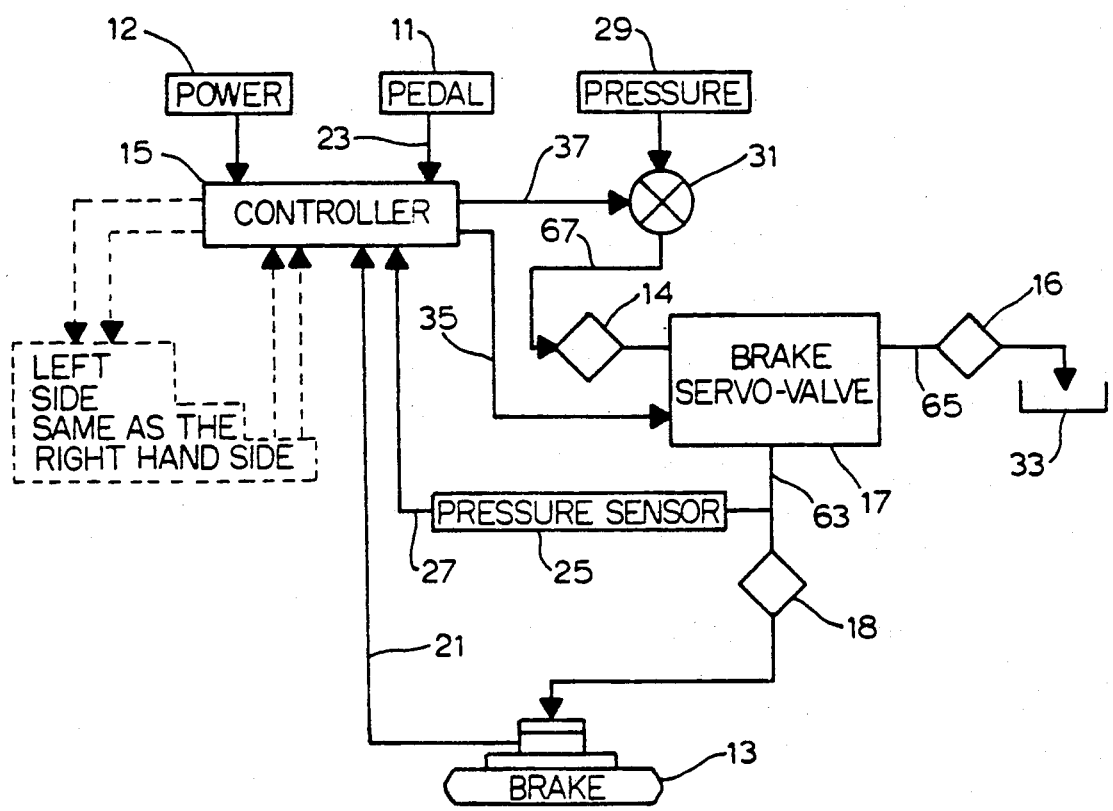
FIG. 1 is a schematic representation of an overall brake and anti-skid control system illustrating the present invention in one form.
Figure 2:
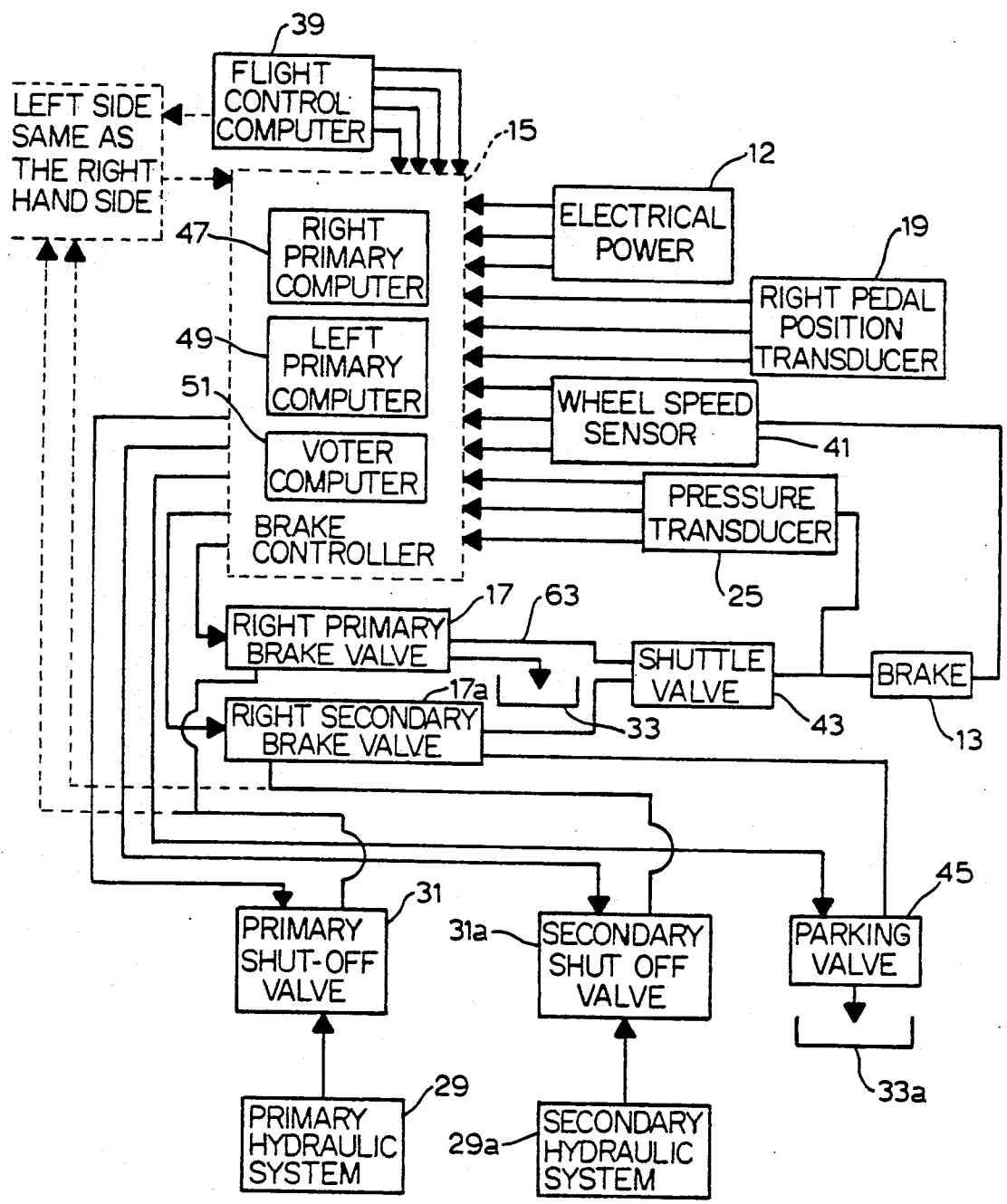
FIG. 2 is a detailed block diagram of the control system of FIG. 1.

In the exemplary environment of an aircraft braking system, the left and right wheels are typically independently braked by actuation of left and right brake pedals under the dual control of either the pilot or co-pilot, however, for clarity and ease of description, only a single illustrative brake pedal 11 or its corresponding transducer 19, and wheel brake 13 are illustrated in FIGS. 1 and 2. The pilot's brake pedal transducer 19 commands a signal to the controller 15 which is proportional to pedal 11 position. Controller 15 in turn drives brake control servo valve 17 to adjust brake 13 pressure until the wheel slip ratio is optimum. Certain parameters and bounds will be software established and programmably modified. For example, a ten percent (adjustable) pedal depression as a threshold before any breaking force is applied is contemplated. Also, full displacement of both brake pedals should correspond to the maximum deceleration that the particular runway-tire combination is capable of supporting. Brake pressure should generally be proportional to the pedal position.

Figure 8:
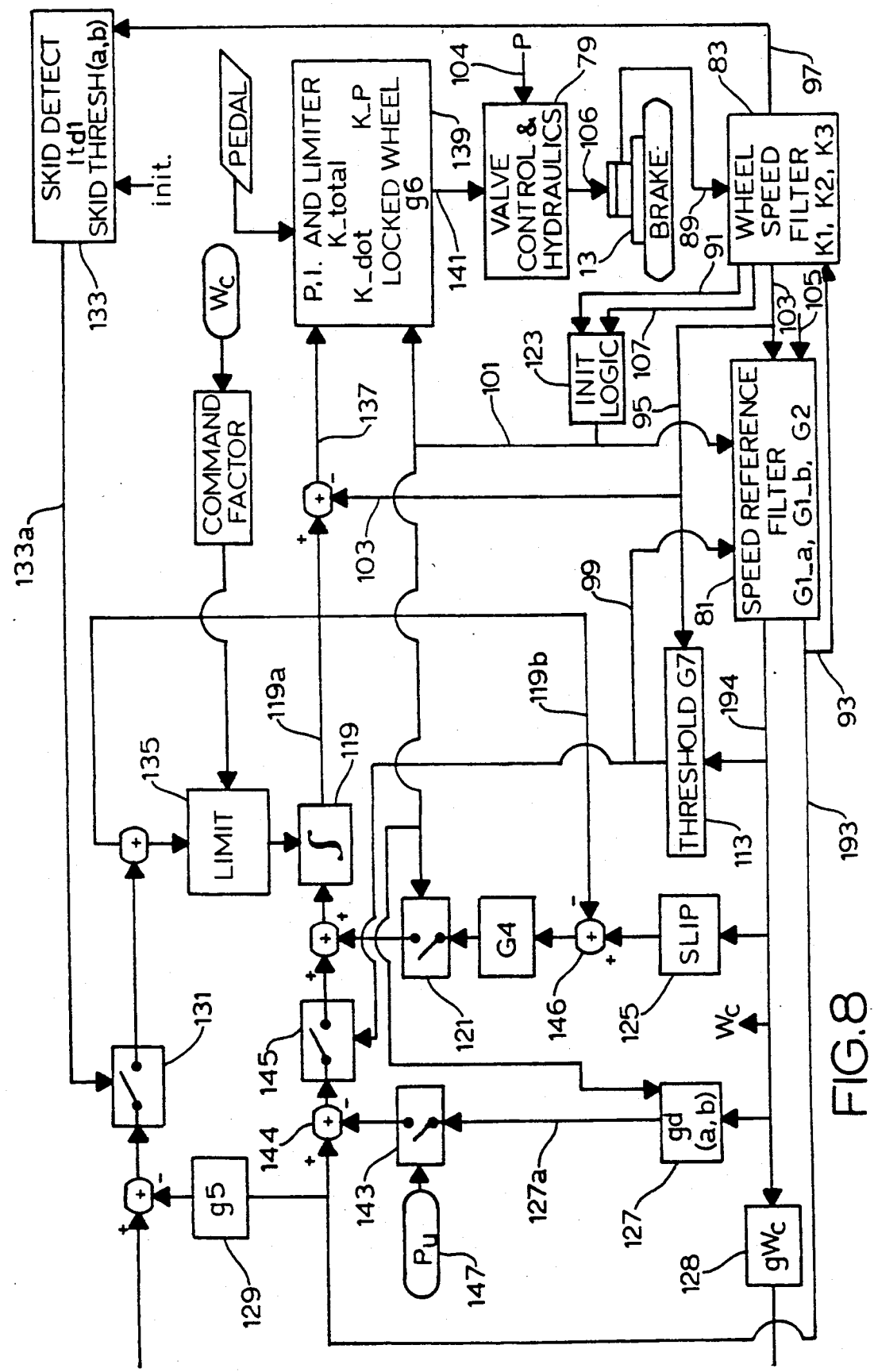
FIG. 8 is another functional flow chart illustrating a second possible control algorithm for a brake and anti-skid control system such as shown in FIGS. 1-3.

Generally speaking, the controller 15 receives an indication of the speed of the wheel being braked via line 21 to be compared with an indication of aircraft speed from an on-board flight control computer 39 (FIG. 2) or a computed estimate of desired wheel speed (FIG. 8). The controller 15 also receives the commanded brake pressure input on line 23 and a feedback indication of actual brake pressure from pressure transducer 25 via line 27. High pressure hydraulic source 29 is connected by shutoff valve 31 and filter 14 to control valve 17 and that valve in turn directs the high pressure fluid to brake 13 through filter 18 or, by way of filter 16, from brake 13 to the low pressure return 33. In a preferred implementation, the control valve 17 is enabled by a signal on line 35 to thereby influence the flow and distribution of fluid between the braking device and the low pressure return. In flight, the shutoff valve 31 is closed due to a lack of any pedal pressure initiated brake request signal on line 37. Some of the overall system redundancy will be more readily apparent in considering FIG. 2.

Essentially the upper half of FIG. 2 relates to the electrical and optical portions of the control system while the lower half is hydraulic in nature. In FIG. 2, it will be noted that the controller 15 actually comprises three separate microcomputers 47, 49 and 51. The third microcomputer 51, which is optional, is for determining which of the other two processors is in error in the event that they do not agree. Similarly, it will be noted that there are three lines each from the right pedal transducer 19, the pressure transducer 25 and the wheel speed sensor 41. So long as two signals agree, the particular system is operating normally. When the two signals disagree, the third signal can be used to determine which signal is correct. The system is still operating safely, but maintenance is necessary to restore the safety factor. As shown in FIG. 2, the hydraulic pressure source 29 may comprise independent primary and secondary systems. When the pedal is depressed, both the primary 17 and secondary 17a brake valves open. A shuttle valve 43 is biased to favor the primary system and that is the system which operates the brake; however, in the event that the primary system pressure drops below the secondary system pressure by a predetermined differential amount, then the shuttle valve moves and the secondary system effects braking.

Figure 3:
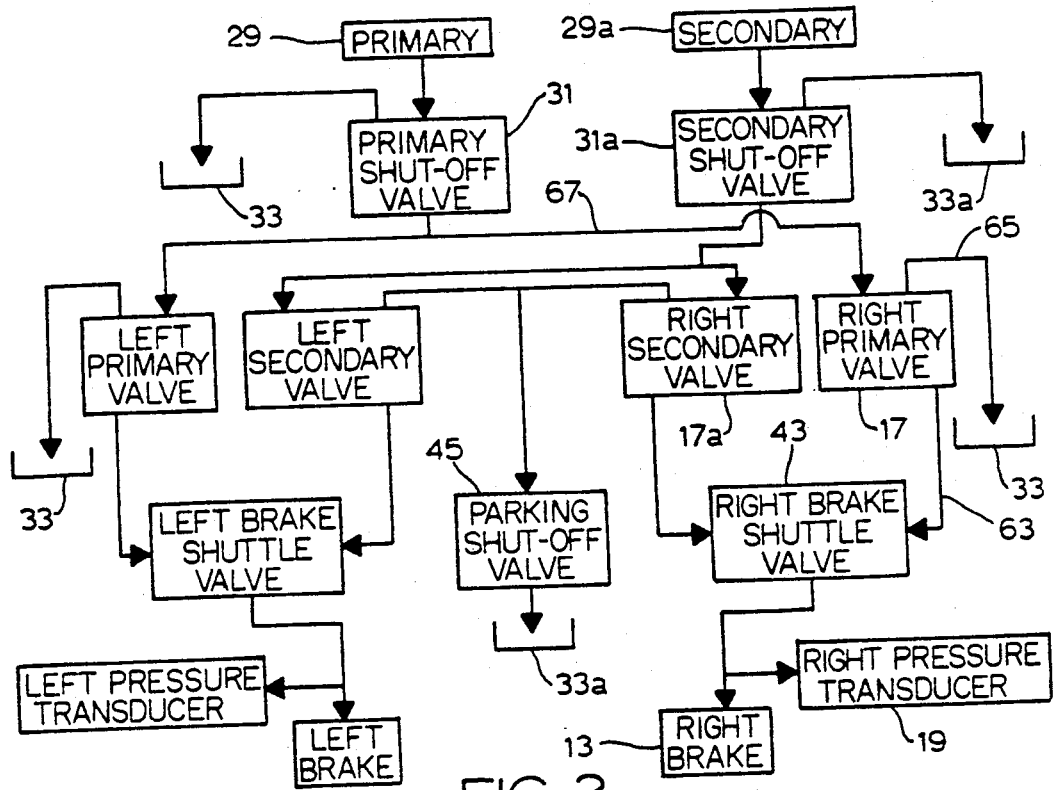
FIG. 3 is a block diagram of the hydraulic portion of the control system of FIGS. 1 and 2.

The hydraulic redundancy may be best seen by comparing the lower portion of FIG. 2 with FIG. 3 where both right and left wheel braking systems are shown. These figures also reveal a variation between the primary and secondary system. While the primary valve 17 permits flow to either the right brake shuttle valve 43 or flow from the brake 13 to the low pressure return 33, the secondary valve 17a permits flow to either the right brake shuttle valve 43 or flow from the brake 13 to the secondary system low pressure return 33a via shut-off valve 45. When the parking selector switch is on, power is removed from the parking valve 45 trapping whatever pressure is metered by the pilot by way of the secondary valve 17a. This pressure will be maintained when the aircraft power is turned off. The secondary system may further differ from the primary system in performing a second task. After take-off and as landing gear is being retracted, the wheels will typically still be spinning. The gear-up selector may initiate energization of the secondary system at a relatively low pressure and for a relatively short period of time to halt wheel rotation before the wheels are fully retracted.

The upper (electrical) portion of FIG. 2 may be implemented in numerous ways, and the following is but one example. As depicted, three identical type 1750A microprocessors are mounted on identical control cards. During normal operation one microprocessor, say 47, controls the right brake, another such as 49 controls the left brake, and the third 51 receives and compares the inputs from the wheel speed sensors 41, pedal position transducers 19 and pressure transducers 25 to determine when a fault occurs. When a fault does occur, the third microprocessor can operate either the primary or secondary hydraulics to isolate the problem. The software may be set to rotate the roles of the three microprocessors from time to time. Thus, each control card may have the same input/output capabilities, namely a pressure transducer input for each wheel, four current drivers for the servo valves such as 17 and 17a, three discrete drivers for the shut-off valves such as 31 and 45, two light emitting diodes and opto-detectors, one each for the left wheel speed sensor and one each for the right wheel speed sensor, and a similar pair of light emitting diodes and opto-detectors, one each for the left pedal position sensor and one each for the right pedal position sensor. Each control card has a dual 1553 data bus transceiver and the conventional quad 1553 data bus from a flight control computer has two buses to one card with one bus to each of the other two. Each microprocessor has a bidirectional communications link to each of the other two microprocessors so that each card has access to the same information as the other two. The elimination of one of the microprocessors and correlative reduction in redundancy is, of course, possible and simply represents a trade-off between reliability, and system weight and cost.

In operation, but no braking or parking brake being called for, shut-off valve 45 is open providing a return flow path for the secondary system, shut-off valve 31 and 31a are both off or in the closed position, and valves 17 and 17a are both off and no pressure is applied to the brake. The shuttle valve is biased toward the primary system and the pressure sensor 25 comprising pressure transducer 19 is indicating zero.

During a normal braking condition, no parking brake is called for and shut-off valve 45 remains open providing a return flow path for the secondary system, shut-off valves 31 and 31a are both open indicating a greater than ten percent pedal depression and both valves 17 and 17a are on, supplying pressure to shuttle valve 43. The shuttle valve is biased to the primary system and brake pressure is sensed by transducer 19.

For the parking function, when the pilot applies brake pedal pressure value 31 is shut off and the shuttle valve 43 moves to the secondary position. Value 45 is then closed. When the pilot removes brake pedal pressure, the secondary system pressure will be trapped and brake line pressure maintained.

In the event of a fault in primary valve 17 or 31, the controller commands no signal to these valves and upon the application of pedal pressure, the shuttle valve moves to the secondary system position.

When the combination of tire and runway conditions will not support the commanded brake torque, the anti-skid function will command the control valve 17 to open a flow path between brake 13 and low pressure return 33, thereby reducing the pressure and preventing skidding The left and right wheel anti-skid functions are independent and are based on an algorithm carried out independently by each of the microprocessors. Actual wheel speed as indicated by sensor 41 and associated processing of its output data is compared to ground speed as supplied by flight control computer 39 or as computed from the wheel speed sensor 41. When the brake wheel speed drops below the reference wheel speed by a calculated amount (i.e., at a calculated slip) indicating that the brake pressure is too high or that the runway/tire coefficient of friction is too low, the algorithm functions to reduce brake pressure to the point where the desired slip is re-established. The algorithm may also include a touchdown hydroplaning override protection. If the actual wheel speed drops to, for example, fifty percent of the indicated speed (50% slip), a full release signal would be sent to the brake valves.

Figure 9:
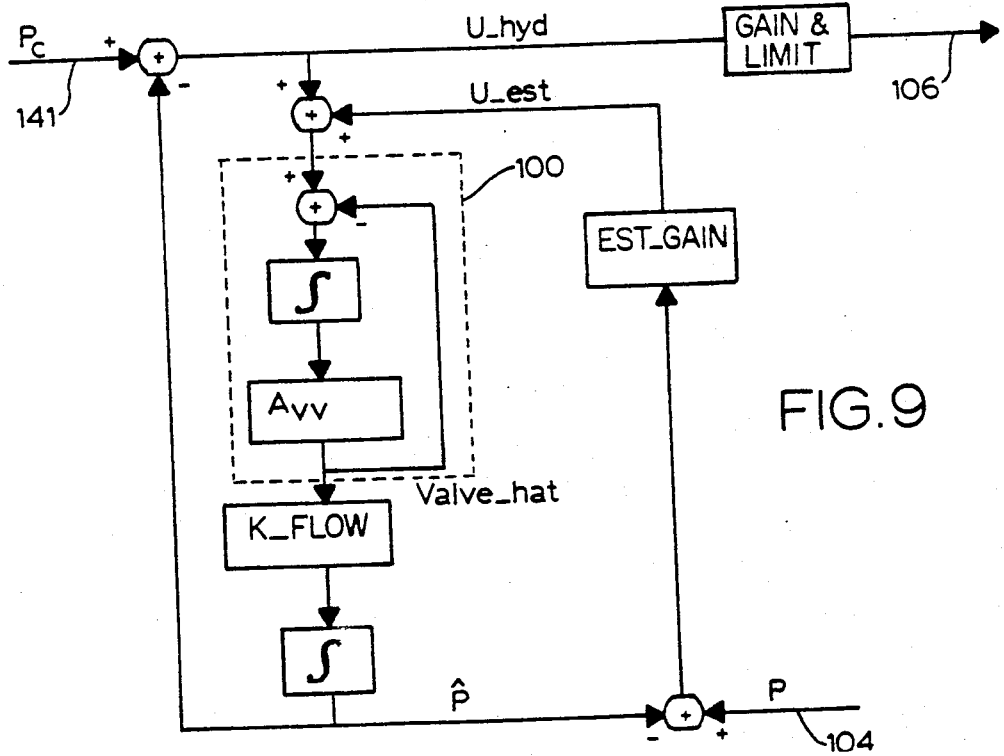
FIG. 9 is a flow chart illustrating the details of one possible valve control for either FIG. 4 or FIG. 8.
Figure 4:
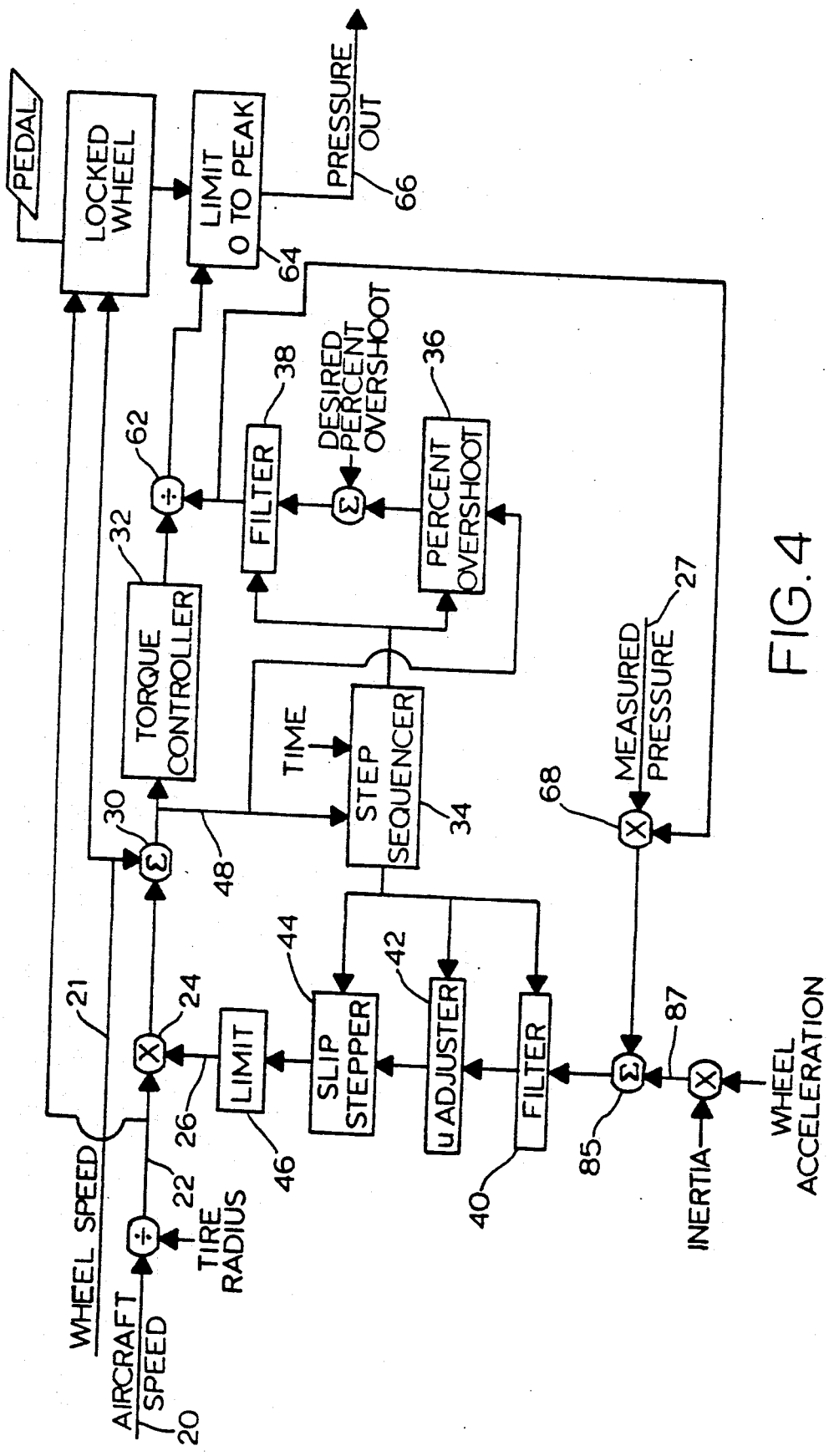
FIG. 4 is a functional flow chart illustrating one possible control algorithm for a brake and anti-skid control system such as shown in FIGS. 1-3.

One illustrative algorithm under which the system of FIGS. 1-3 may operate is shown in the flow chart of FIG. 4. A signal indicative of aircraft speed is supplied, e.g., from the on board flight control computer or inertial navigation system 39 on line 20 while a signal indicative of the angular velocity of the braked wheel is supplied on line 21. The wheel speed signal on line 21 may, for example, be derived in the manner to be later described in conjunction with FIG. 11. Aircraft speed is divided by a constant reflecting the size of the tire and the result (synchronous speed) is supplied on line 22 to a multiplying circuit 24. Multiplier circuit 24 also receives by way of line 26, a signal indicating the desired slip, and the product output on line 28 indicates the desired wheel speed. The desired wheel speed signal on line 28 is compared to the actual wheel speed signal on line 21 and the difference (error) output from summer 30 is supplied to the torque controller 32 (the output of which is desired torque), the step sequencer 34 and the percent overshoot circuit 36. A torque gain estimator including the low-pass filter 38 and the percent overshoot 36 controls the damping of the function based on the gain. Percent overshoot is but one of many possible parameters which may be used to control damping. Divider 62 combines the desired torque and gain information and provides a desired pressure indication to the limiter 64 which in conjunction with the pilot pedal input provides a commanded pressure signal on line 66 to a valve controller for example, as shown in FIG. 9. An estimated brake torque is derived from measured pressure on line 27 combined in multiplier 68 with the output of the gain control. The difference between this estimate and the effective torque as computed from wheel acceleration. for example from FIG. 11, multiplied by a constant wheel inertia is provided by summer 85. The output of the summer 85 is dynamic torque.

The step sequencer 34 responds to speed error signals from summer 30 and timing signals to periodically introduce a disturbance into the system and a determination of how the system is operating on the leading or back side of the Mu/slip curve. The desired front side of the curve has a positive slope and an increase in slip (or percent slip) results in an increase in friction. A decrement in slip corresponds to a decrease in friction. The slip stepper 44 introduces a small, e.g. one percent, increase or decrease into the system and monitors the result thereof to assure continued operation on the front side of the curve. Timing pulses of 500 milliseconds period and 100 millisecond duration are supplied to the step sequencer 34 and it in turn supplies either the leading edge of the timing pulse (called a step edge) or the entire pulse (called a step holder) or both to several of the other components. In particular, the low pass filter 40 receives only the step hold; the Mu adjuster 42, percent overshoot 36 and low-pass filter 38 receive both; and the stepper 44 receives only the leading edge.

Figure 4A:
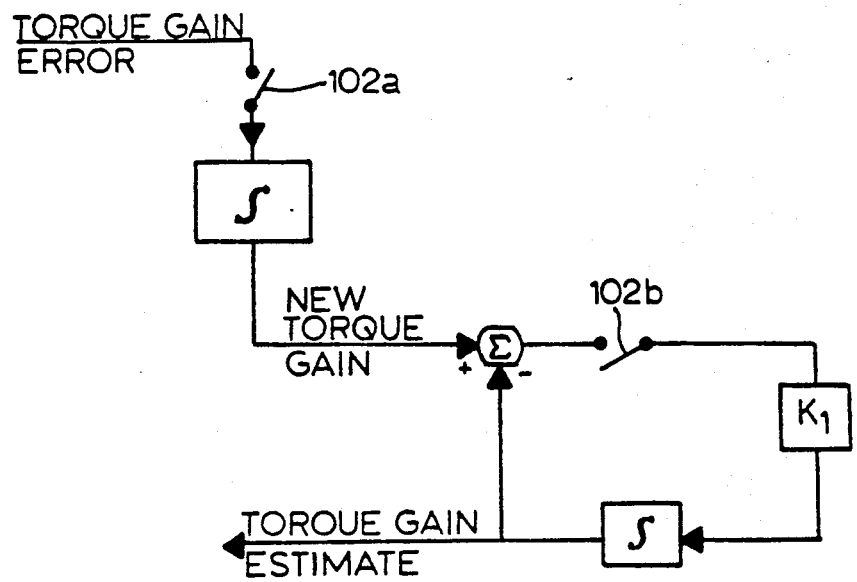
FIG. 4a illustrates some of the details of the torque gain filter of FIG. 4.

The low pass torque gain filter 38 is shown in greater detail in FIG. 4a. This filter has switches 102a and 102b; 102a is closed and 102b is open during the step hold function and both switches change state on the trailing edge of that signal. Its input is torque gain error and the output is torque gain estimate.

Limiter 46 functions to assure that the excessive slip ratio is avoided and may, for example, maintain the slip ratio between about five and twenty-five percent. The output from the torque control circuit 32 is a signal indicative of the desired torque which is translated into a signal indicative of desired hydraulic pressure by division in divider 62 and thereafter passes through limiter 64 to provide the actual pressure output signal on line 66. The estimated torque gain is supplied to multiplier 68 along with the measured pressure from pressure sensor 25 on line 27 and the output brake torque signal is supplied to summer circuit 85. Wheel acceleration (the first derivative of the signal on line 21) is multiplied by a signal which reflects the overall inertia of the moving portions of wheel (tire, brake, etc.) and after filtering, provides a signal on line 87 which represents the desired torque or ground forces exerted on the tire.

The software implementation of the FIG. 4 flow chart has been successfully run on an AD100 simulation computer available from Applied Dynamics Internation of Ann Arbor, MI.

Figure 5:
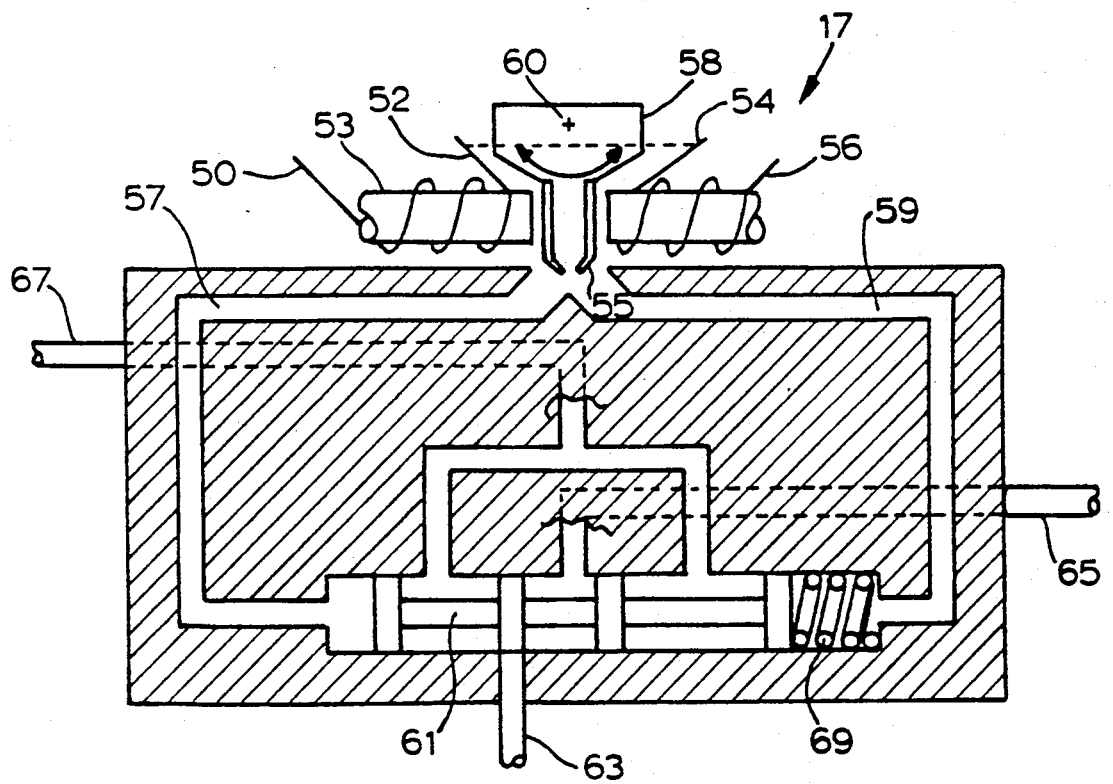
FIG. 5 illustrates a flow control valve suitable for use as a primary valve in the system of FIGS. 1-3.

Referring now to FIG. 5, the operation of an exemplary flow control servo valve 17 is illustrated in cross-section. The two coils 50-52 and 54-56 are connected so that their fields reinforce one another by connecting the leads 52 and 54 as indicated by the dotted line. When an electrical input is applied to the leads 50 and 56 of the torque motor 53, it causes the armature 58 and jet pipe assembly 55 to pivot about an armature pivot point 60 and more fluid impinges on one receiver, say 57, than on the other receiver 59. There is a resulting differential pressure on the opposed faces of spool 61 and the spool moves in a direction opposite that in which the jet pipe assembly had moved, in the assumed case toward the right, compressing spring 69. Rightward motion of spool 61 applies high pressure fluid from source line 67 to the brake line 63. A signal of opposite polarity to torque motor 53 will cause the jet pipe assembly 55 to pivot counterclockwise to supply greater pressure to conduit 59 and moving the spool toward the left, venting pressure from brake line 63 to the low pressure return line 65. Typically, the spring 69 bias will be such as to move the spool toward the left and cause the brake line 63 to be drained to return line 65 when there is no flow from jet pipe assembly 55. The spool is illustrated in a central or neutral position where neither line 63 nor 65 is receiving fluid and will move from this position toward the left under the urging of spring 69 if there is inadequate flow being diverted into conduit 57. An increase in the flow directed to conduit 57 will move the spool to the right supplying pressurized fluid to line 63 and to the brake.

Figure 6:
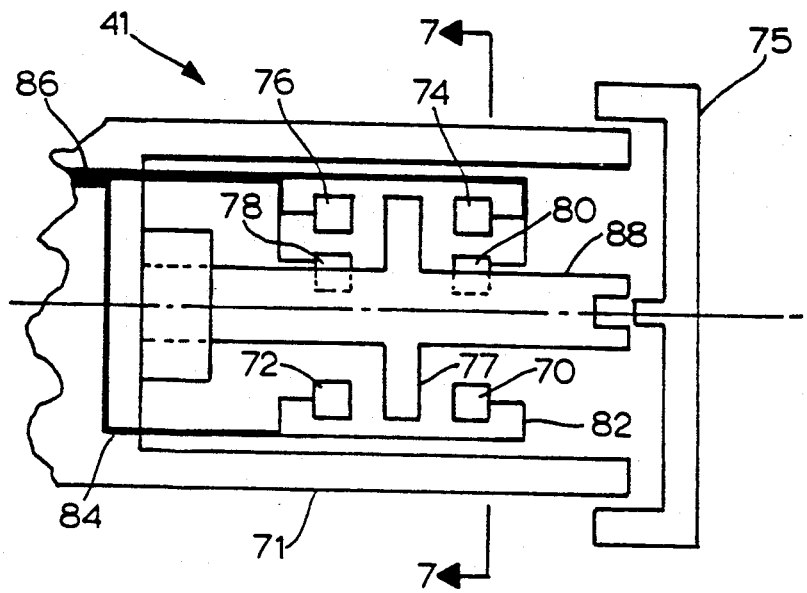
FIG. 6 shows a fiber optic wheel speed sensor suitable for use in the system of FIGS. 1 and 2.
Figure 7:
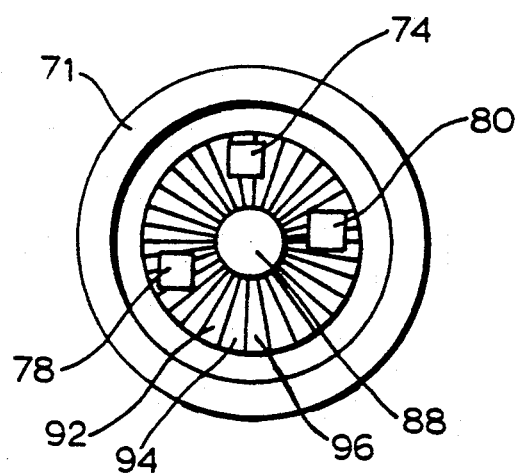
FIG. 7 is a view in cross-section along lines 7—7 of FIG. 6.

The fiber optic arrangement for sensing wheel speed is shown in FIGS. 6 and 7. The transducer 41 is fixed to the axle 71 and contains a rotatable shaft 88 and encoding wheel 77 coupled to and driven by the aircraft wheel hubcap 75. The shaft 88 is journalled in and extends from bearing 90 in a cantilevered fashion. A flexible compensating coupling may also be employed. The encoding wheel has numerous shaded bands such as 92 and 96 interleaved with transparent bands such as 94 and these alternate bands intermittently interrupt the light path between a light source fiber optic such as 74 on one side of the encoding wheel and a corresponding fiber optic sensor such as 76 on the other side. A toothed encoding wheel or one with reflective bands could also easily be used. In one preferred implementation, two hundred fifty six pulses per revolution and an operating range of five to twenty five hundred RPM were attained. As shown, there are three such source/- sensor pairs including sources 70, 74 and 80 and sensors 72, 76 and 78 respectively within the transducer, one for each microprocessor of FIG. 2. As pointed out earlier, such an optical wheel speed sensing arrangement is not susceptible to electromagnetic interference and is capable of very high (>200° C.) operating temperatures. With the triple redundancy, the sensor is a highly reliable device.

In FIG. 8, a second algorithm suitable for the practice of the present invention is shown. The function of the valve control 79 is shown in greater detail in FIG. 9 while operation of the speed reference filter 81 is described in FIG. 10 and that of the wheel speed filter 83 is amplified in FIG. 11. The actual algorithm has been implemented on the above-mentioned AD100 simulation computer. As in FIG. 4, the blocks depicted represent transfer functions. Throughout these four figures, the conventions such as integrator ($\int$) imply a transformation to represent the dynamic response of the actual difference equations in the program code in continuous time, and G indicates a gain or multiplication by a constant.

The output of the integrator 119 is a speed command on line 119a to a closed loop speed control. The sensed wheel speed is fed back on line 103, and the speed difference is input to the proportional integral controller 139.

As an aircraft lands, a wheel which is not rotating strikes the ground and is accelerated immediately after initial touchdown. This is called spin-up and is detected by the initial logic block 123. Prior to spin-up, switches 131 and 145 are open and switch 121 is closed which closes a feedback loop around integrator block 119 via line 119b and gain function G4. The estimated wheel speed on line 103 from the wheel speed filter 83 rises as the wheel spins up and the reference speed output on line 194 from the speed reference filter block 81 follows it after a small delay. The output of the integrator 119 is compared to the product of the reference speed multiplied by slip gain factor 125 at summer 146. The output of summer 146 is input to the integrator 119 by way of the gain factor G4 and the closed switch 121 which causes the output of the integrator 119 to be initialized to the reference speed multiplied by the slip gain factor.

The detection of spin-up by block 123 sets spinup=.-true. on line 101 which causes switch 121 to be opened. Switch 145 is closed and the integrator 119 is now controlled by wheel acceleration commands received via switch 145. A Mu-hunting command computed from the reference speed on line 194 multiplied by a gd gain factor 127 is supplied by the normally closed switch 143 to a summer 144 where it is summed with a deceleration command supplied by way of line 193. Both the deceleration command and the Mu-hunting command act to drive the output of the brake integrator 119 toward zero, thereby commanding application of the brake.

The signal on line 101 is also effective to select one of the two constants (a or b) for the gain factor 127. This is a two gain block using one gain for the first second after spin-up and the other during subsequent operation. Gain factors 128 and 129 are used to compute the speed increment for skid recovery from the reference speed on line 194 and the reference acceleration on line 193. Normally open switch 131 closes to reset integrator 119 to that point in the event that a skid is detected by the skid detector 133. Limiter 135 is interposed to make sure that the resetting of the integrator does not go too far. A skid is detected in block 133 when the estimated acceleration output from the wheel speed filter block 83 becomes more negative than a preset threshold. Following detection of a skid, the output of the skid detector on line 133a is disabled for a fraction of a second so that the output of the integrator 119 is only incremented once during each skid. Multiple increments per skid could result in improper resetting of the integrator. A speed error signal is supplied on line 137 to a proportional and integral error computation 139 which outputs a commanded pressure on line 141. Switches 143 and 145 are normally closed. Integrator 119 is held at its current value by control 147 opening switch 143 in the event that the pedal pressure command is less than the computer indicated pressure on line 141.

The brake controller can operate in either of two modes. In the first commonly called Mu-hunting, the intent is to brake the vehicle as rapidly as possible. This implies controlling the brake so that the wheel is operated at a speed which corresponds to the peak of the aforementioned Mu/slip curve of the tire and surface. In this mode, a deceleration command is computed in the speed reference filter 81 as will be described later in detail and is summed with the Mu-hunting command at summer 144 as described earlier.

In the second mode, commonly called auto-braking, the intent is to brake at a controlled deceleration which requires less than the maximum friction, i.e., Mu, that the tire can generate. The desired deceleration is input by the pilot prior to landing. The usable friction is a function of the condition, e.g., dry or wet, of the runway surface, and typically the pilot has the option of selecting one of three or four deceleration levels. This mode is implemented in one form of the present invention by supplying the pilot selected deceleration command on line 193 and opening switch 143 to block the Mu-hunting command.

In both the Mu-hunting and the auto-braking modes, anti-skid protection is provided by the brake controller. This is effected by incrementing the commanded speed output of the integrator 119 which results in a reduction of the pressure applied to the brake on detection of a skid. Skid detection and incrementation of the integrator have already been described.

Figure 9A:
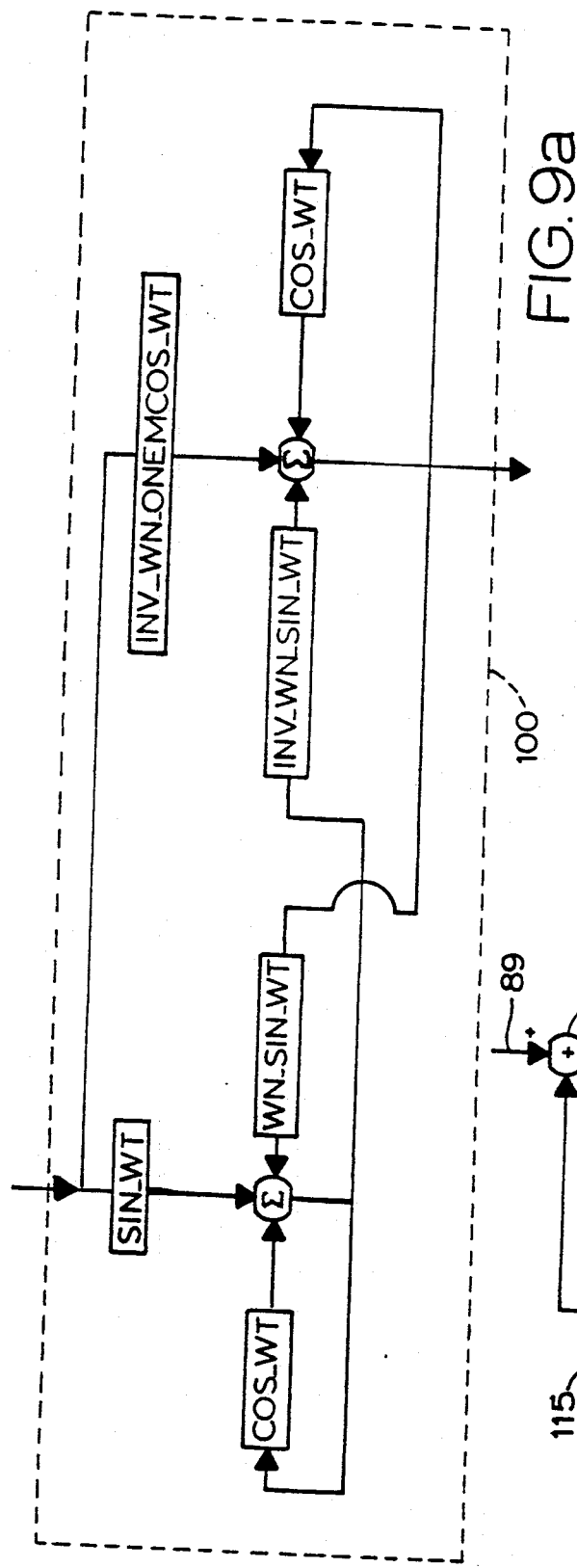
FIG. 9a illustrates a second order approximation alternative to the feedback loop of FIG. 9.

Comparing FIGS. 8 and 9, the input on line 141 is a commanded pressure while the other input denoted "P" on line 104 is from a pressure transducer 25. The output on line 106 which has been multiplied by a gain constant and then limited to plus or minus ten milliamperes is the drive current to the brake hydraulics selector valve. Were this circuit of FIG. 9 to be utilized in conjunction with the controller illustrated in FIG. 4, input 141 would correspond to 66 in FIG. 4 with the output being to the leads 50 and 56 of the coil in FIG. 5. The pressure controller of FIG. 9 includes a model of the dynamics of the hydraulics with an estimated pressure denoted by P being computed. The estimated pressure is made to track the actual pressure by the use of pressure feedback. This controller has the advantage that it is relatively insensitive to noise on the measured pressure. The first order dynamics of the feedback loop 100 may, in some cases, be replaced by the more accurate second order dynamics block illustrated in FIG. 9a. The gains employed in the model may be scheduled as functions of speed to more accurately approximate the brake dynamics.

Figure 10:
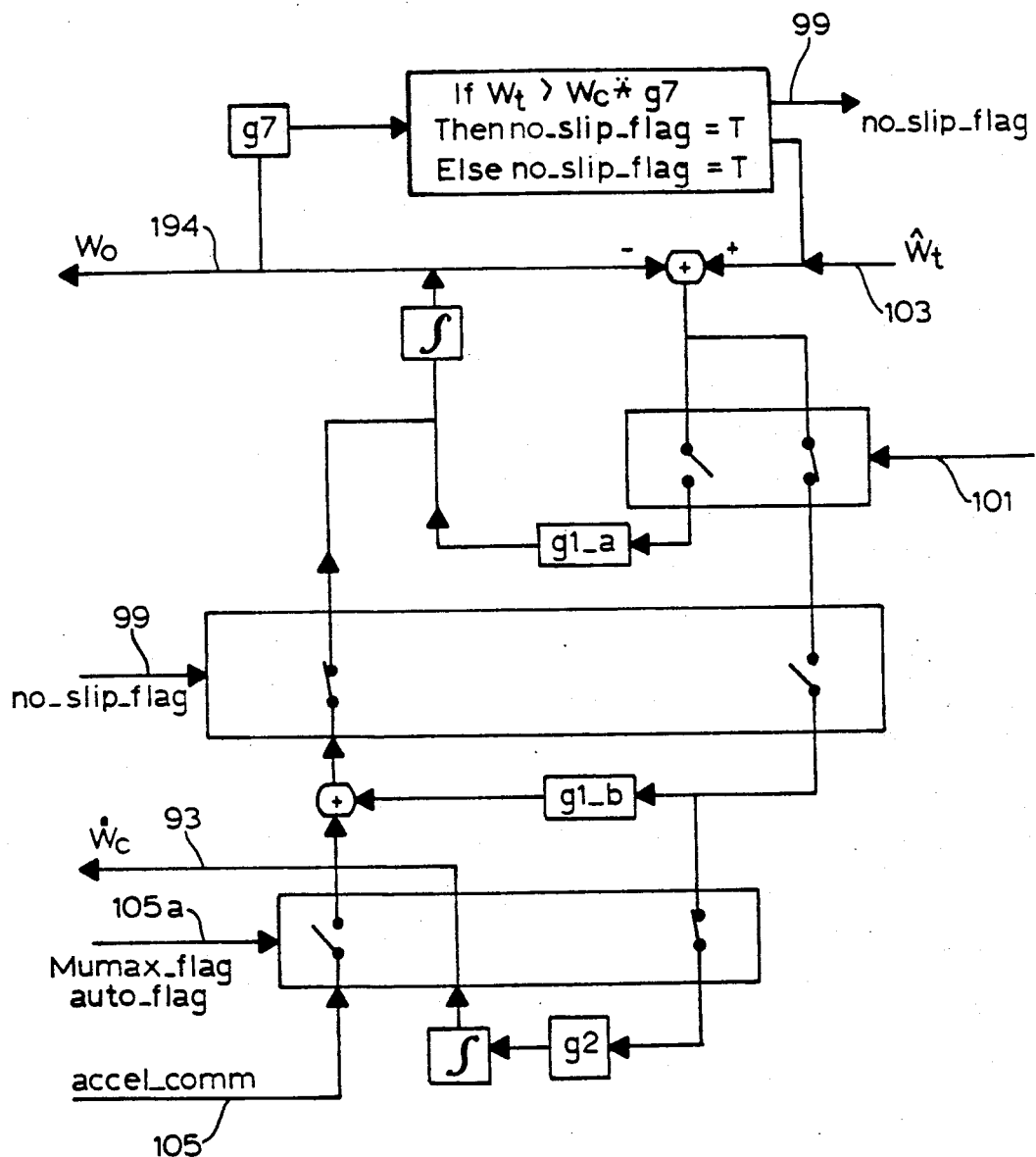
FIG. 10 is a flow chart illustrating the details of one possible speed reference filter for FIG. 8.

Comparing FIGS. 8 and 10, the input on line 103 is the estimated wheel speed from the wheel speed filter 83. One output on line 194 is the computed reference speed and the other output on line 93 is the reference acceleration used as an acceleration command to the integrator 119. The input on line 101 controls the switches and is set to true after spin-up is detected in block 123. The switches are shown in the after spin-up condition. Prior to spin-up, the contacts are in the reversed positions, i.e., the left hand contact is closed and the right hand contact is open, thereby closing a feedback loop around the integrator via the gain function gl_a. The reference speed output on line 194 is compared with the estimated wheel speed on line 103 and the difference, i.e., the error signal, is input to the integrator thereby forcing the integrator output to track the estimated wheel speed during spin-up. The gain gl_a is relatively high which results in the output responding rapidly to changes in the estimated wheel speed.

After spin-up, the switches are in the positions shown in the diagram. The processing in the circuit of FIG. 10 depends on the desired brake control mode. Two signals are input from the aircraft prior to landing. If maximum braking is desired, a mumax_flag is set on line 105a to cause the controller to enter the Mu-hunting mode described earlier. If the controlled deceleration autobraking mode is desired, an auto_flag is set on line 105a and the desired deceleration command is input on line 105. In the Mu-hunting mode, the three switches are configured as shown in FIG. 10. The error signal described in the previous paragraph is input to the first integrator through a gain gl_b and to the second via a gain g2. Gains gl_b and g2 are relatively low and are selected so that the reference speed and reference acceleration outputs are heavily smoothed thereby minimizing the effect of transient changes in the estimated wheel speed on these outputs. In particular, the reference acceleration settles in less than five seconds to an acceptable approximation to the maximum deceleration which the tire/runway interface can support during the current landing with only minor skidding. In the autobraking mode, the switch settings are inverted which results in the pilot selected accel_comm on line 105 being loaded into and stored in the acceleration integrator throughout the landing, with the integrator input being opened by the appropriate switch contact. In autobraking, the input to the reference speed integrator is also disconnected from the reference acceleration by the switch contact being open. The circuit of FIG. 10 performs one additional function. Slipping of the wheel is detected by comparing the instantaneous estimated wheel speed with the product of the heavily smoothed reference speed multiplied by a fraction gain g7. If the instantaneous estimated speed is the higher of the two, then the wheel is not considered to be slipping and the no_slip_flag is set to .true., otherwise it is set to .false. If the no_slip_flag is .false., the reference speed and acceleration are held by opening their normally closed input switches.

Figure 11:
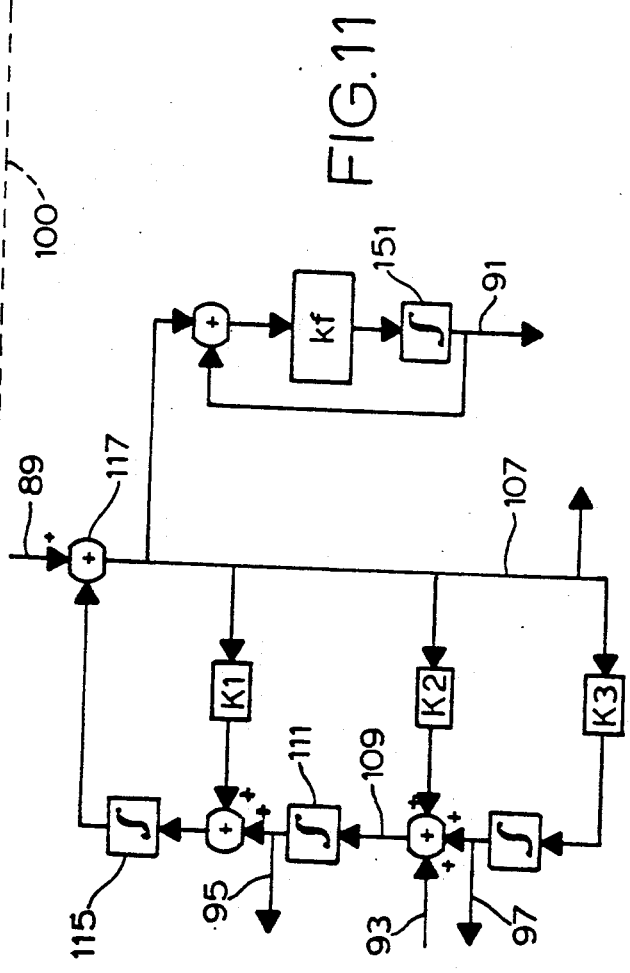
FIG. 11 is a flow chart illustrating the details of one possible wheel speed filter for either FIG. 4 or FIG. 8.

Comparing FIGS. 8 and 11, the signal on line 89 from wheel 13 is actually a wheel position indicative signal (a count of a number of pulses generated by the segments 92, 94 and 96 of FIG. 7) and the signal on line 107 is a count (position) error signal. The input on line 93 from the speed reference filter (FIG. 10) is indicative of computed angular acceleration (which is set to 0 in the FIG. 4 implementation). The combined signal of integrator 110 subsequent to the summer on line 109 is also acceleration and upon integration by circuit 111 an angular velocity indicative signal is provided as output on line 103 to the threshold circuit 113. Further integration by integrator 115 provides a count to the summer 117 suitable for comparison to the input count on line 89. The output on line 97 is an error or difference signal for use in FIG. 8, but would correspond to acceleration were this FIG. 11 implementation used in conjunction with FIG. 4. The low-pass filter built about integrator 151 has no counterpart in the FIG. 4 version. The algorithm as described in conjunction with FIGS. 8-11 has been implemented on the abovementioned AD100 simulation computer.

From the foregoing, it is now apparent that a novel brake control and anti-skid arrangement has been disclosed meeting the objects and advantageous features set out hereinbefore as well as others, and that numerous modifications as to the precise shapes, configurations and details may be made by those having ordinary skill in the art. For example, features of either of the algorithms suggested in the specification may readily be incorporated into the other. As another example, the speed sensing scheme utilizing a high speed vernier clock as suggested in U.S. Pat. No. 4,434,470 and having either a magnetic or an optical pick-up may be used to provide the speed or position inputs utilized by the system of the present invention.

We claim:

1. In an anti-skid control system, a device for providing a pulse train the repetition rate of which is representative of the instantaneous angular velocity of a wheel comprising:

first and second fiber optic light paths from a pair of independent light sources to a location close to the wheel;

third and fourth fiber optic light paths from said location to a further location remote from the wheel;

common means at the location close to the wheel and responsive to wheel rotation for alternately interrupting and completing a first light-passing circuit between the first and third light paths, and a second light-passing circuit between the second and fourth light paths.

2. The device of claim 1, further comprising first and second transducers at the further location for converting sensed light variations into corresponding electrical pulse trains the repetition rates of which is representative of the instantaneous angular velocity of the wheel.

3. The device of claim 2, further comprising means at the further location responsive to one of the electrical pulse trains for computing aircraft ground speed.

4. The device of claim 3, wherein the common means comprises a disk having alternating generally transparent and generally opaque areas.

5. The device of claim 2, wherein the wheel is an aircraft main landing gear wheel, and further comprising circuitry at the further location and responsive to one of the electrical pulse trains for computing the apparent ground speed of the aircraft main landing gear wheel, for comparing the computed apparent ground speed to an independently determined reference ground speed, and for initiating a corrective action in the event the indicated ground speed and the reference ground speed differ by more than a calculated amount.

6. The device of claim 2, further comprising means for comparing the repetition rates of the first and second electrical pulse trains and for initiating corrective action in the event that the compared repetition rates differ by more than a prescribed amount.

7. The device of claim 6, further comprising fifth and sixth fiber optic light paths from a further independent light source to a location close to the wheel and from said location to a further location remote from the wheel respectively, said common means at the location close to the wheel being responsive to wheel rotation for additionally alternately interrupting and completing a third light passing circuit between the fifth and sixth fiber optic light paths, a third transducer coupled to said sixth fiber optic light path at the further location for converting sensed light variations into a corresponding further electrical pulse train the repetition rate of which is representative of the instantaneous angular velocity of the wheel, said corrective action comprising comparison of each of the first and second electrical pulse train repetition rates to the repetition rate of the further electrical pulse train and accepting as correct a value which differs from each of at least two different ones of the repetition rates by less than a prescribed amount.

8. A combined brake and anti-skid controller for a wheeled vehicle comprising:
 a continuous source of pressurized hydraulic fluid;
 a hydraulically actuated wheel rotation braking device which responds to applied hydraulic pressure to apply a braking force to a wheel of the vehicle to arrest wheel motion;
 a low pressure hydraulic fluid return;
 a flow control valve in a circuit between the source, the return, and the braking device for selectively directing fluid from the source to the braking device and from the braking device to the return;
 means for sensing the fluid pressure applied to the wheel rotation braking device; and
 means responsive to the sensed pressure and for controlling the control valve to thereby influence the flow and distribution of fluid between the braking device and the return.

9. The combined brake and anti-skid controller for a wheeled vehicle as set forth in claim 8, wherein the means for influencing the distribution includes means for comparing the motion of the wheel to the theoretical motion that wheel should be experiencing in a free wheeling condition and for diverting additional fluid to the return when the comparison indicates actual wheel motion is a calculated threshold difference below the theoretical wheel motion.

10. A process of monitoring the motion of a vehicle braked wheel and controlling the application of a hydraulically applied braking force to the wheel to arrest wheel motion, comprising the steps of influencing by means of a flow control valve the distribution of fluid between a wheel braking device and a fluid return, comparing the motion of the wheel to a theoretical wheel motion that wheel should be experiencing in a free wheeling condition, and diverting additional fluid to the return when the comparison indicates actual wheel motion is a calculated threshold difference below the theoretical wheel motion.

11. The process of claim 10, including the further step of utilizing a computed torque gain input that varies with actual torque as a slip ratio control to control the hydraulic pressure applied to arrest wheel motion and control wheel speed.

12. The process of claim 10, including the further steps of monitoring the hydraulic pressure applied to arrest wheel motion and control wheel speed and diverting additional fluid to the return if the monitored pressure exceeds a commanded pressure.

13. A process of monitoring the motion of a vehicle braked wheel and controlling the application of a hydraulically applied braking force to the wheel comprising the steps of:
 introducing a controlled slip between the wheel and a surface on which the wheel rolls to arrest wheel motion;
 deriving signals indicative of the slip and of the braking force;
 periodically incrementing the slip indicative signal;
 sensing the resulting change in braking force indicative signal; and
 effecting one of reducing the hydraulically applied braking force in the event the resulting change proceeds opposite from the increment and increasing the hydraulically applied braking force in the event the resulting change proceeds in the same direction as the increment.

14. A combined brake and anti-skid controller for a wheeled vehicle comprising:
 means for computing an estimate of the speed of a wheel of the vehicle including means for sensing wheel motion and providing a signal indicative thereof, means for combining the motion indicative signal with a computed estimate signal representing the detected motion to form a third signal which is the difference between the detected motion and the calculated estimate thereof, means for integrating the third signal to provide a signal representative of the first derivative of the wheel motion, means for performing a second integration of the third signal, and means for feeding back the result of the second integration as the computed estimate of the speed of the wheel;
 means for comparing the estimated speed of the wheel to the theoretical speed the wheel should be experiencing in a free wheeling condition;
 a hydraulic braking system for applying a brake force to the wheel; and
 means including a flow control valve for reducing the braking force applied by the hydraulic system when the comparison indicates estimated wheel speed is a calculated threshold difference below the theoretical wheel speed.

15. A process of estimating a time dependent wheel position and the first and second derivatives thereof, and of using the estimate to control a braking force applied to a vehicle wheel, comprising the steps of sensing the motion of a wheel, combining the sensed motion with a computed estimate representing the sensed motion to form the difference between the sensed motion and the computed estimate thereof, integrating the difference between the sensed motion and the computed estimate thereof to provide a representation of the second derivative of the time dependent wheel position, performing a further integration of the second derivative of the time dependent wheel position to provide a representation of the first derivative of the time dependent wheel position, performing a still further integration to provide a representation of the time dependent wheel position, feeding back the result of the still further integration as the computed estimate representing the sensed motion, and utilizing at least one of the estimated time dependent wheel position and the first and second derivatives thereof in controlling the application of a braking force to the vehicle wheel.

16. A combined brake and anti-skid controller for a wheeled vehicle comprising:
 means for sensing the motion of a vehicle wheel;
 means for comparing the sensed motion of the vehicle wheel to the theoretical motion the wheel should be experiencing in a free wheeling condition;

a flow control valve in a circuit between a source of pressurized hydraulic fluid, a low pressure hydraulic fluid return, and a hydraulically actuated braking device, the flow control valve directing selectively fluid from the source to the braking device and from the braking device to the return; and means including the flow control valve for diverting additional fluid to the return when the comparison indicates actual wheel motion is a predetermined threshold difference below the theoretical wheel motion.

17. The combined brake and anti-skid controller for a wheel vehicle as set forth in claim 16, wherein the means for sensing includes means at a location close to the vehicle wheel responsive to wheel rotation for alternatively interrupting and completing a light passing circuit thereby generating an optical pulse train the repetition rate of which is representative of the instantaneous angular velocity of a wheel, and electrical circuitry responsive to the optical pulse train for computing the apparent speed of the wheel.

18. The combined brake and anti-skid controller for a wheel vehicle as set forth in claim 17, wherein the electrical circuitry includes means for combining a wheel motion indicative signal with a computed estimate signal representing the detected motion to form a signal which is the difference between the detected motion and the computed estimate thereof, first means for integrating the difference signal to provide a signal representative of the second derivative of wheel motion with respect to time, second means for integrating the signal representative of the second derivative to provide a signal indicative of the first derivative of wheel motion with respect to time, third means for performing an integration of the first derivative signal.

19. The combined brake and anti-skid controller for a wheeled vehicle as set forth in claim 16, further including means for computing a torque gain which varies with actual wheel torque and for utilizing the computed value for controlling the hydraulic pressure applied to the braking device.

20. The combined brake and anti-skid controller for a wheeled vehicle as set forth in claim 16, further comprising means for monitoring the hydraulic pressure applied to the braking device and for controlling the flow control valve to divert additional fluid to the return if the monitored pressure exceeds a commanded pressure.

* * * * *